(12) United States Patent
Brinkmann

(10) Patent No.: US 9,291,301 B2
(45) Date of Patent: Mar. 22, 2016

(54) SUPPORT DEVICE

(71) Applicant: Donald Allan Brinkmann, Golden, CO (US)

(72) Inventor: Donald Allan Brinkmann, Golden, CO (US)

(*) Notice: Subject to any disclaimer, the term of this patent is extended or adjusted under 35 U.S.C. 154(b) by 178 days.

(21) Appl. No.: 13/959,276

(22) Filed: Aug. 5, 2013

(65) Prior Publication Data

US 2014/0034795 A1 Feb. 6, 2014

Related U.S. Application Data

(60) Provisional application No. 61/679,795, filed on Aug. 6, 2012.

(51) Int. Cl.
| | |
|---|---|
| A47J 47/16 | (2006.01) |
| F16M 13/02 | (2006.01) |
| A47L 17/00 | (2006.01) |
| A47J 47/20 | (2006.01) |

(52) U.S. Cl.
CPC ............... F16M 13/02 (2013.01); A47L 17/00 (2013.01); A47J 47/16 (2013.01); A47J 47/20 (2013.01)

(58) Field of Classification Search
USPC ............ 248/37.3, 37.6, 110, 111, 113, 311.2, 248/312; 24/3.9, 3.1, 910; 211/70.7, 211/119.009, 65
See application file for complete search history.

(56) References Cited

U.S. PATENT DOCUMENTS

| | | | | |
|---|---|---|---|---|
| 625,435 | A | * 5/1899 | Clark | ........................... 248/37.6 |
| 5,038,955 | A | 8/1991 | Studer | |
| 5,322,382 | A | 6/1994 | Hull | |
| 5,518,211 | A | * 5/1996 | Gaskill et al. | ................ 248/37.6 |
| 5,730,405 | A | * 3/1998 | Nichols, IV | ............... 248/213.2 |
| 6,619,604 | B1 | 9/2003 | Stillman | |
| 6,991,200 | B2 | 1/2006 | Stillman | |
| 7,500,580 | B2 | 3/2009 | Hawkins | |

* cited by examiner

*Primary Examiner* — Alfred J Wujciak
(74) *Attorney, Agent, or Firm* — Roger A. Jackson

(57) ABSTRACT

Disclosed are support devices for an article that is adjacent to a sink margin, the support devices provide a storage solution for the article and hold the article in an upright position, thereby helping to prevent seepage and loss of soap fluids from the article and also directs sponge drainage either into a sink or a container. The devices work on either single of double bowl sinks, and on either under-mounted or drop-in sinks, or can be positioned adjacent to a sink on the countertop. The devices are easily movable, can be placed in multiple locations, can be easily cleaned and function without the need for suction cups or other attachments. When the article is being used, the devices are out of the way resulting in minimal conflict with the use and activity around the sink, thereby allowing maximum unimpeded use of the sink area.

4 Claims, 14 Drawing Sheets

SUPPORT DEVICE

RELATED PATENT APPLICATIONS

This application claims the benefit of U.S. provisional patent application Ser. No. 61/679,795 filed on Aug. 6, 2012 by Donald Allan Brinkmann of Golden, Colo., U.S.

TECHNICAL FIELD

The present invention relates generally to a support for an article for use with the support interfacing with multiple base components. More specifically, the present invention is a support device that removably engages a self contained cleaning utensil wherein the support device directs fluid seepage from the cleaning utensil to a selected area in relation to the base component.

BACKGROUND OF INVENTION

Cleaning utensils are constantly becoming more numerous and varied over time in performing more specialized functions leading to a plethora of these handheld utensils being randomly placed throughout the kitchen countertop area adding to clutter and potentially a soap scum and water/grease stains on the countertop requiring cleaning. As a more modern development in particular related to scrubbers for dishes, glasses, and cooking utensils, is a self contained scrubbing brush and scouring pad, wherein a reservoir is disposed within an integral handle that contains a dishwashing liquid, thus eliminating the need for the separate application of dishwashing liquid, resulting in faster, easier, and more convenient dish, glass, and cooking utensil washing as the dishwashing liquid automatically dispenses to the sponge/brush/pad.

However, this self contained scrubbing brush and scouring pad again is usually placed upon the countertop, or in the sink, or adjacent to the sink edge and with this self contained scrubbing brush and scouring pad not having any sophisticated valves or shutoffs to prevent the seepage or wicking of the dishwashing fluid from the scrub brush or scouring pad portion thereby resulting in a gooey mess of oozed out dishwashing liquid, that also typically semi solidifies into almost a paste type substance when exposed to the atmosphere. Thus leaving a sticky gooey mess to clean up from the surface that is adjacent to the scrub brush or scouring pad, not to mention the waste of dishwashing liquid.

Wherein an ideal solution to this problem would be to support the scrub brush or scouring pad portion above the reservoir to help prevent the seepage or wicking of the dishwashing fluid from the scrub brush or scouring pad portion, and to have or provide flow channels for the dishwashing liquid seepage that does occur being the residual dishwashing liquid from the scrub brush or scouring pad portion to drain to a specific location to make clean up on the seeped dishwashing liquid easier.

Looking at the prior art, in U.S. Pat. No. 6,619,604 to Stillman, disclosed is a tray for supporting a cleaning utensil that has a holder for supporting a cleaning utensil that includes a support platform that is designed to support and retain a portion of a cleaning utensil, the holder also has a drainage conductor near a front edge of the support platform. In Stillman, the portion of the cleaning utensil is retained via a continuous retention ridge protrusion adjacent to a drainage channel, wherein a suction cup is for attaching the holder to a countertop or sink lip.

Continuing in the prior art, in U.S. Pat. No. 6,991,200 to Stillman which is a continuation of U.S. Pat. No. 6,619,604 also to Stillman, the '200 patent discloses a holder for supporting a cleaning utensil that includes a support platform that is designed to support and retain a portion of a cleaning utensil, the holder also has a drainage conductor near a front edge of the support platform. In Stillman, the portion of the cleaning utensil is retained via a continuous retention ridge protrusion adjacent to a drainage channel, wherein a suction cup is optional for attaching the holder to a countertop or sink lip.

Further in the prior art, in U.S. Pat. No. 5,322,382 to Hull et al., disclosed is a combination lotion applicator and support stand, wherein the desire is to have the sponge portion slightly lower than the lotion reservoir that is disposed within the handle with the goal being to keep the sponge wetted with the lotion, which the support stand facilitates, see FIGS. 1 and 2. Also in Hull, the lotion applicator and stand are a matched set sold in combination, noting that a cover 20 is always used in conjunction with the sponge, thus to preclude external seepage of the lotion from the sponge due to the handle causing the lotion to gravity flow into the sponge.

Also, in the prior art, in U.S. Pat. No. 5,038,955 to Studer et al., disclosed is a paintbrush caddy that clips upon the edge of a paint tray while providing an inclined drainage platform for the paintbrush to reside against, thus allowing residual paint to drip back into the tray while retaining the brush via drain apertures 66, see FIGS. 2, 3, and 4. Studer also uses a spring loaded clamping means that is utilized to provide a removably engagable attachment to the tray edge while keeping the drainage platform at an angle to accommodate the paint drainage back into the tray.

Continuing, in the prior art, in U.S. Pat. No. 7,500,580 to Hawkins disclosed is a bracket that straddles the upper edges of an open paint can to form a bridge across the open paint can top that facilitates a clip type hanger disposed at a mid point in the bracket to suspend a paintbrush over the open can of paint such that brush paint drips fall back into the can, see FIGS. 3, 4, and 5. In Hawkins, the bracket can also be used to secure the paint can lid closed as shown in FIG. 6.

What is needed is a low cost, compact, and easy to install article support device that supports an article in the form of a cleaning utensil with a self contained cleaning sponge/scouring pad with a dishwashing detergent dispensing reservoir, wherein the article is supported in an upright manner to minimize seepage of the dishwashing detergent from the sponge/pad resulting in waste of the dishwashing detergent and the resultant gooey mess of seeped dishwashing detergent, and if seepage does occur, it is directed to an appropriate area.

SUMMARY OF INVENTION

Broadly, the present invention is a support device for an article that is adjacent to a sink margin, the support device including a first arcuate flexible finger having a longitudinal axis, with the first finger having a proximal end portion and an opposing distal end portion. Further included is a second arcuate flexible finger having a lengthwise axis, with the second finger having a proximal end portion and an opposing distal end portion. Also, a shoulder element that is sized and configured to cradle the article in an upright position, the shoulder element is disposed in an attached manner therebetween the first proximal end portion and the second proximal end portion. Wherein the first flexible finger, the shoulder element, and the second flexible finger approximately form an inverted "U" shape that frictionally straddles the sink margin. Wherein operationally, the support device cradles the article in the upright position adjacent to the sink margin.

These and other objects of the present invention will become more readily appreciated and understood from a consideration of the following detailed description of the exemplary embodiments of the present invention when taken together with the accompanying drawings, in which;

REFERENCE NUMBERS IN DRAWINGS

Figure 1:
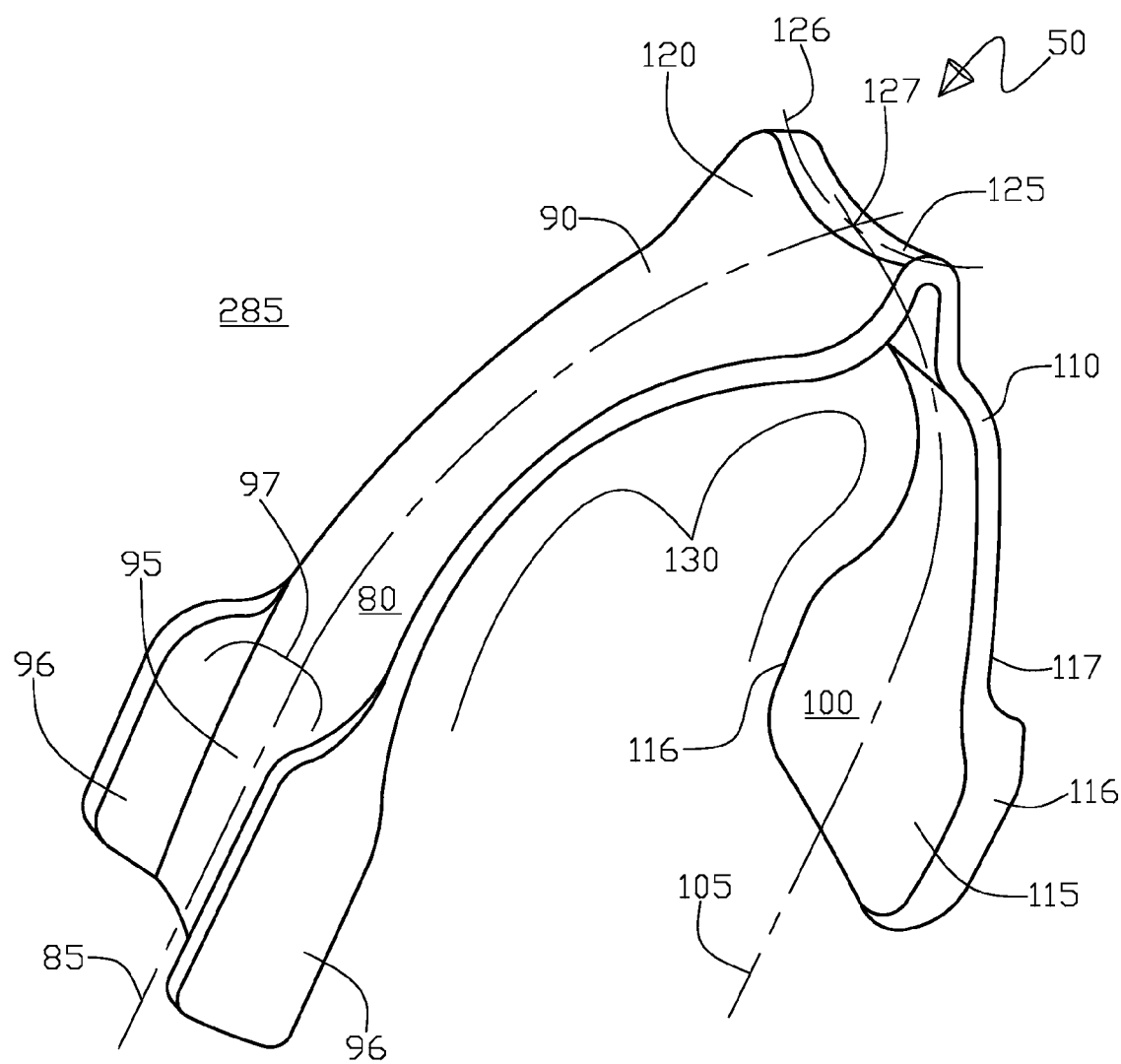
FIG. 1 shows a perspective view of the support device that includes the first arcuate flexible finger, its longitudinal axis, the first finger proximal end portion, the first finger distal end portion, the second arcuate flexible finger, its lengthwise axis, the second finger proximal end portion, the second finger distal end portion, the shoulder element, the cradle segment, and the inverted "U" shape.

50 Support device
55 Article
56 Length of article 55
57 Seepage of article 55 and sponge 66
60 Upright position or support of the article 55
61 Self-contained cleaning sponge of the article 55
62 Reservoir handle for dispensing dishwashing detergent to the sponge 61 of the article 55
65 Article in the form of a cleaning utensil being a self-contained cleaning sponge/brush/scouring pad 61 with dishwashing detergent dispensing reservoir 62 disposed therein
66 Sponge
70 Sink
71 Walls of the sink 70
75 Margin of the sink 70
80 First arcuate flexible finger
85 Longitudinal axis of the first arcuate flexible finger 80
90 First proximal end portion of the first arcuate flexible finger 80
95 First distal end portion of the first arcuate flexible finger 80
96 First curved extension of the first distal end portion 95
97 First concave channel of first curved extension 96
100 Second arcuate flexible finger
105 Lengthwise axis of the second arcuate flexible finger 100
110 Second proximal end portion of the second arcuate flexible finger 100
115 Second distal end portion of the second arcuate flexible finger 100

116 Second curved extension of the second distal end portion 115
117 Second concave channel of the second curved extension 116
120 Shoulder element
125 Cradle segment
126 Arcuate axis at the cradle segment 125
127 Perpendicular relationship of arcuate axis 126 to the longitudinal axis 85 and the lengthwise axis 105
130 Inverted "U" shape
135 Frictionally straddles
140 Shoe assembly
145 Cup
150 Bottom of cup 145
155 Opposing lip of cup 145
160 Surface
165 Base
170 Accommodate the cup bottom 150
175 Extension of the base 165
176 Peripheral ridge of the base 165
177 Receptacle of the base 165
180 Depression of the base 165
181 Receiving slot of the depression 180
185 Receiving a portion of the article 55
190 Flexible clip
200 Inward portion of the flexible clip 190
205 Opposing outward portion of the flexible clip 190
210 Cradle portion of the flexible clip 190
211 Curved axis of the cradle portion 210
212 Concave surface of the cradle portion 210
215 Retainably suspending an opposing portion of the article 55
220 Platform device
225 Retention basin
226 Floor of the retention basin 225
230 Peripheral portion
231 Outer peripheral notch in peripheral portion 230 for sponge support 280
232 Inner peripheral notch in peripheral portion 230 for sponge support 280
235 Spillway margin
240 Raised rib
245 Extension
250 Extension 245 depending outwardly
251 Reverse angled end portion of extension 245
255 Substantial conforming area to the sink margin of the basin 225 and extension 245
260 Bi-modal shaped ridge
261 Continuously curving concave surface of the bi-modal shaped ridge 260
262 Bi-modal shaped ridge 260 extending at least as high as the raised rib 240
265 Parallel projection of the ridge 260 and the rib 240
270 Ridge retainably suspending a portion of the article 55 over the basin 225
275 Directing liquids to the sink 70
280 Sponge support
281 Lip 155 interface of the sponge support
282 Drain aperture for sponge support 280
285 Open environment

DETAILED DESCRIPTION

Figure 2:
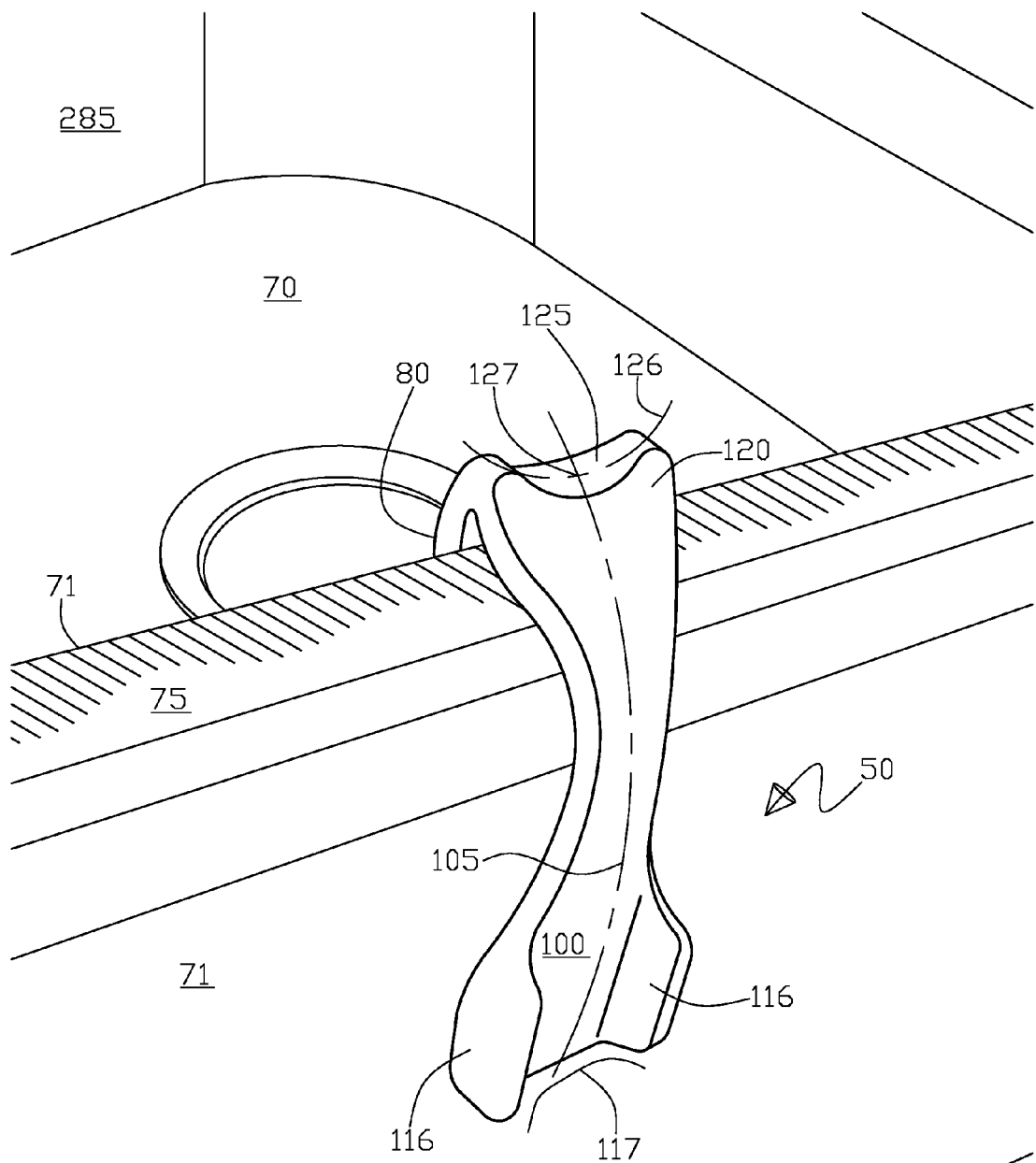
FIG. 2 shows a use perspective view of the support device straddling the margin of the sink, with the cradle segment, the shoulder element, the first arcuate flexible finger, and the second flexible finger.

With initial reference to FIG. 1, shown is the perspective view of the support device 50 that includes the first arcuate flexible finger 80, its longitudinal axis 85, the first finger 80 proximal end portion 90, the first finger 80 distal end portion 95, the second arcuate flexible finger 100, its lengthwise axis 105, the second finger 100 proximal end portion 110, the second finger 100 distal end portion 115, the shoulder element 120, the cradle segment 125, and the inverted "U" shape 130. Next, FIG. 2 shows a use perspective view of the support device 50 straddling the margin 75 of the sink 70, with the cradle segment 125, the shoulder element 120, the first arcuate flexible finger 80, and the second flexible finger 100.

Figure 3:
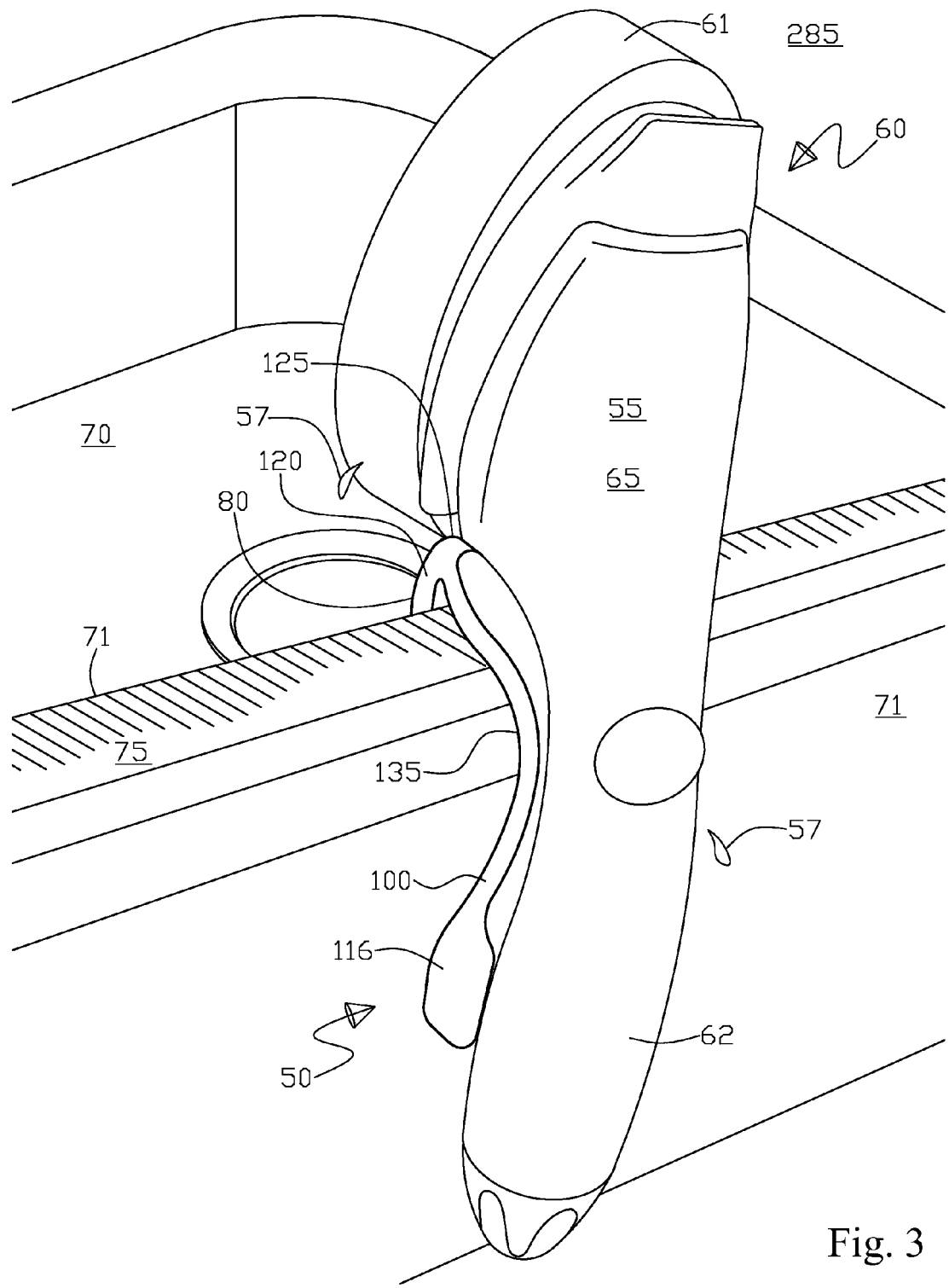
FIG. 3 shows a perspective view of the support device straddling the margin of the sink, with the cradle segment, the shoulder element, the first arcuate flexible finger, and the second flexible finger, wherein the cradle segment is supporting the article in an upright position, with the article in the form of a cleaning utensil being the self-contained cleaning sponge having dishwashing detergent disposed therein.
Figure 4:
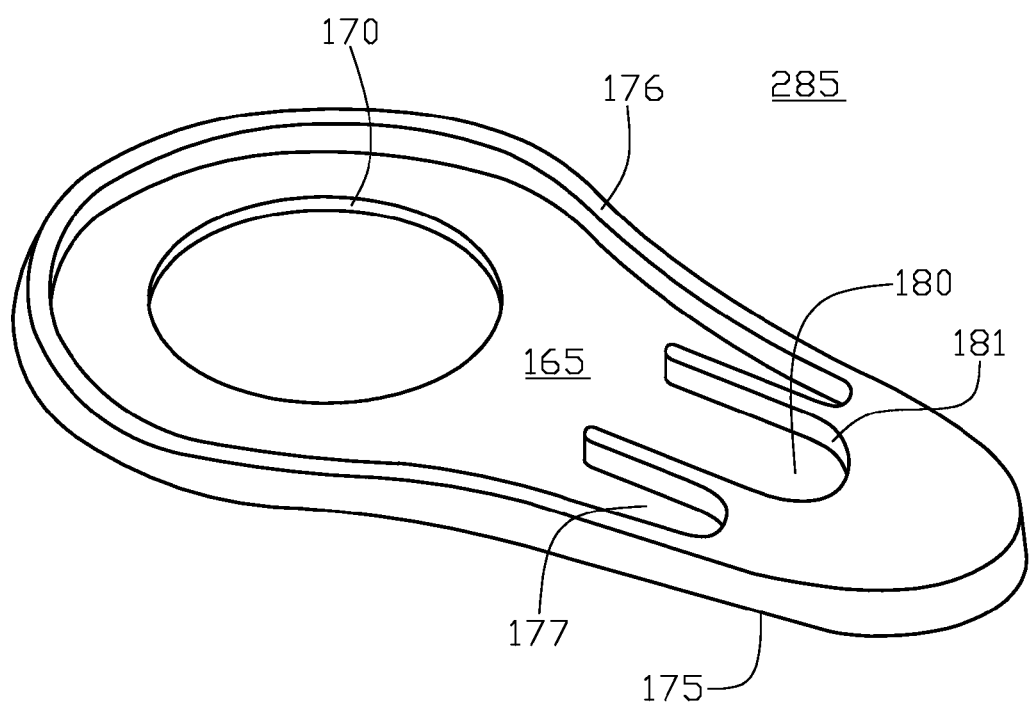
FIG. 4 shows a perspective view of the base portion of the shoe assembly including the extension of the base, and the depression of the base.
Figure 5:
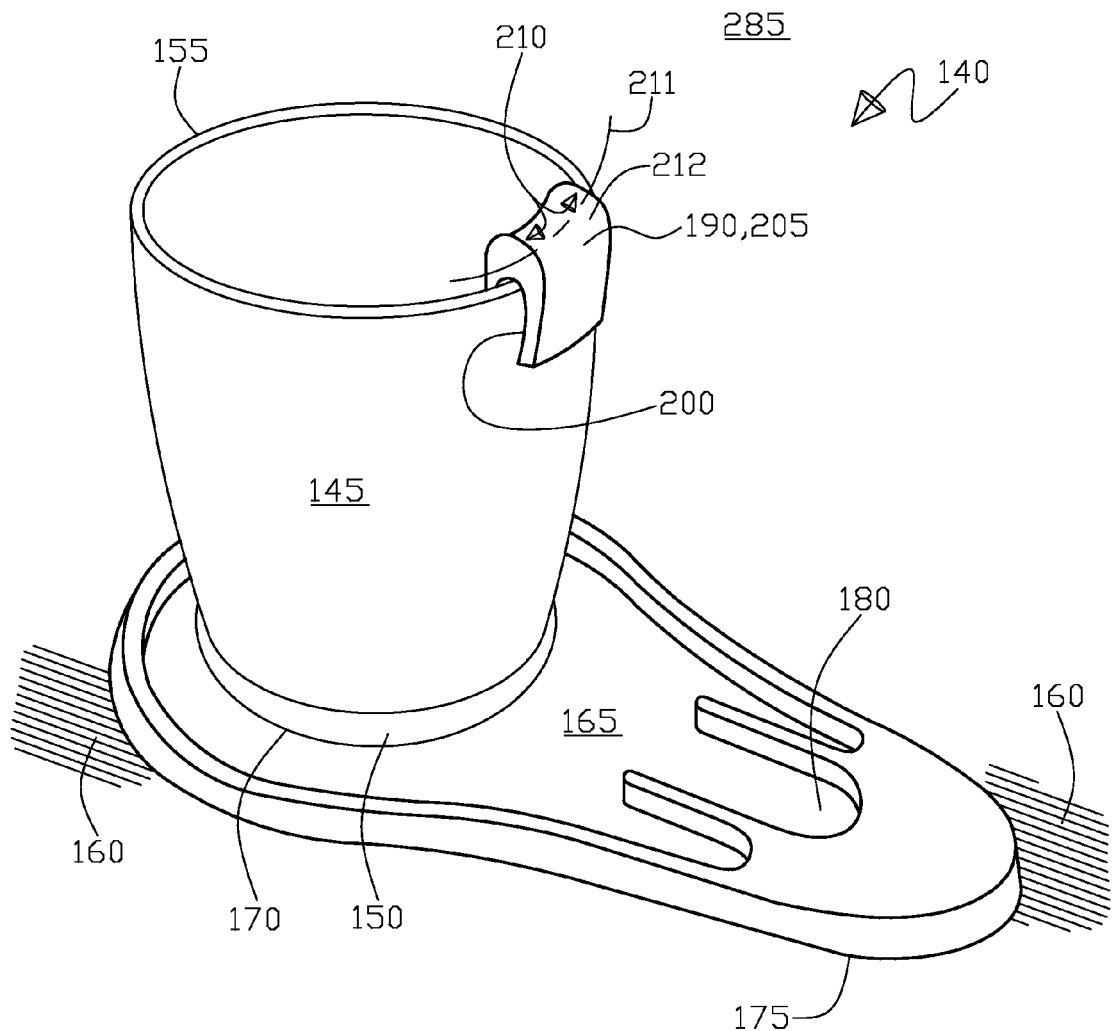
FIG. 5 shows a perspective view of the shoe assembly with the base portion, the extension of the base, the depression of the base, the cup, the bottom of the cup, the opposing lip of the cup, the cup bottom being accommodated in the base, the flexible clip, the inward portion of the flexible clip, the opposing outward portion of the flexible clip, the cradle portion of the clip, and the base upon the surface.

Continuing, FIG. 3 shows a use perspective view of the support device 50 straddling the margin 75 of the sink 70, with the cradle segment 125, the shoulder element 120, the first arcuate flexible finger 80, and the second flexible finger 100, wherein the cradle segment 125 is supporting the article 55 is in an upright position 60, with the article 55 in the form of a cleaning utensil 65 being self contained cleaning sponge having dishwashing detergent. Further, FIG. 4 shows a perspective view of the base portion 165 of the shoe assembly 140 including the extension 175 of the base 165, and the depression 180 of the base 165. Next, FIG. 5 shows a perspective view of the shoe assembly 140 with the base portion 165, the extension 175 of the base 165, the depression 180 of the base 165, the cup 145, the bottom 150 of the cup 145, the opposing lip 155 of the cup 145, the cup 145 bottom 150 being accommodated 170 in the base 165, the flexible clip 190, the inward portion 200 of the flexible clip 190, the opposing outward portion 205 of the flexible clip 190, the cradle portion 210 of the clip 190, and the base 165 upon the surface 160.

Figure 6:
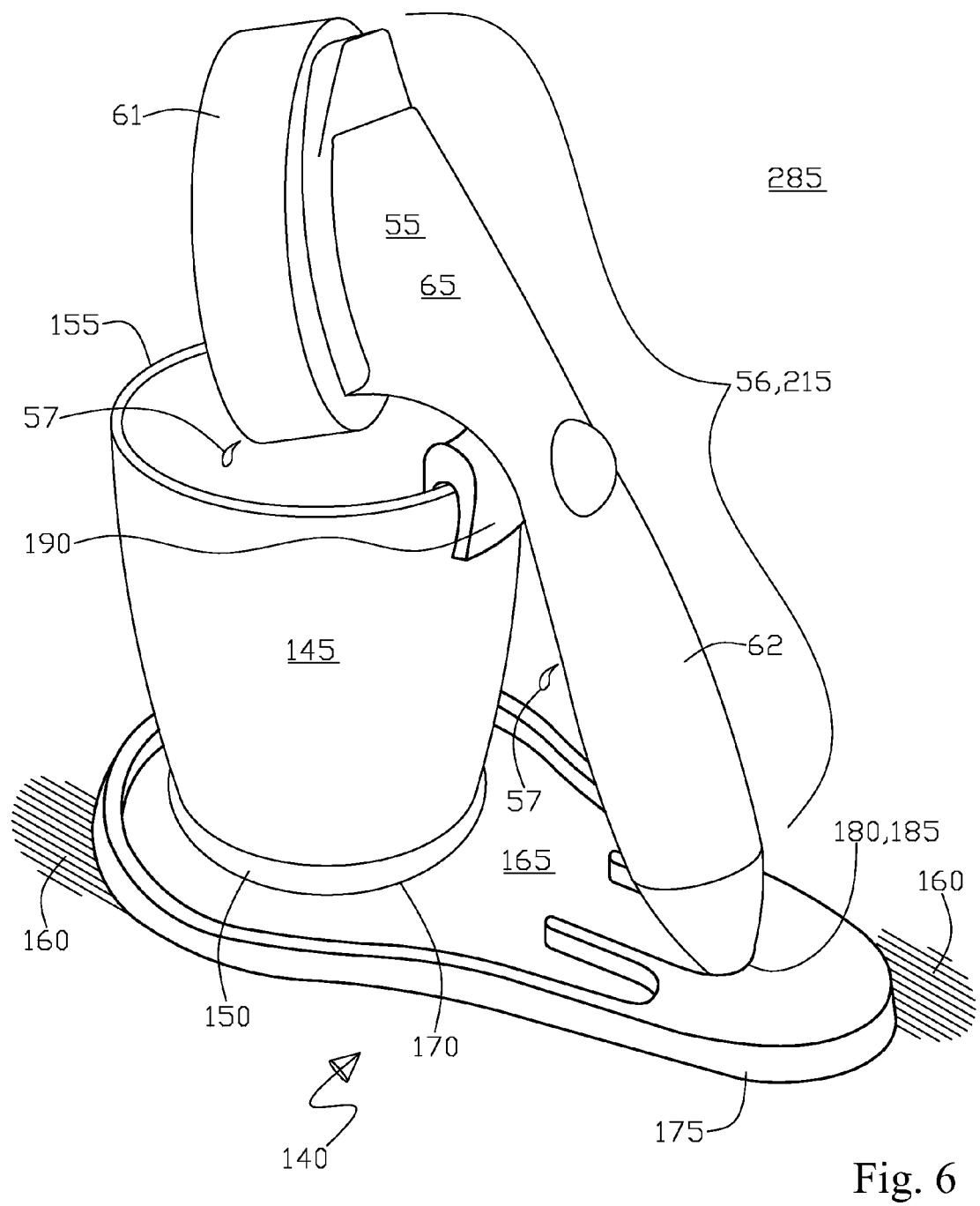
FIG. 6 shows a perspective use view of the shoe assembly with the base portion, the extension of the base, the depression of the base, the cup, the bottom of the cup, the opposing lip of the cup, the cup bottom being accommodated in the base, the flexible clip, the inward portion of the flexible clip, the opposing outward portion of the flexible clip, the cradle portion of the clip, and the base upon the surface, wherein the article is in the form of a cleaning utensil being self contained cleaning sponge having therein disposed dishwashing detergent, wherein the depression is receiving a portion of the article and the flexible clip cradling the opposing portion of the article.

Yet further, FIG. 6 shows a perspective use view of the shoe assembly 140 with the base portion 165, the extension 175 of the base 165, the depression 180 of the base 165, the cup 145, the bottom 150 of the cup 145, the opposing lip 155 of the cup 145, the cup 145 bottom 150 being accommodated 170 in the base 165, the flexible clip 190, the inward portion 200 of the flexible clip 190, the opposing outward portion 205 of the flexible clip 190, the cradle portion 210 of the clip 190, and the base 165 upon the surface 160. Also in FIG. 6, the article 55 is in the form of a cleaning utensil 65 being self contained cleaning sponge having dishwashing detergent disposed therein, wherein the depression 180 is receiving 185 a portion of the article 55 and the flexible clip 190 cradling 210 the opposing portion of the article 55.

Figure 7:
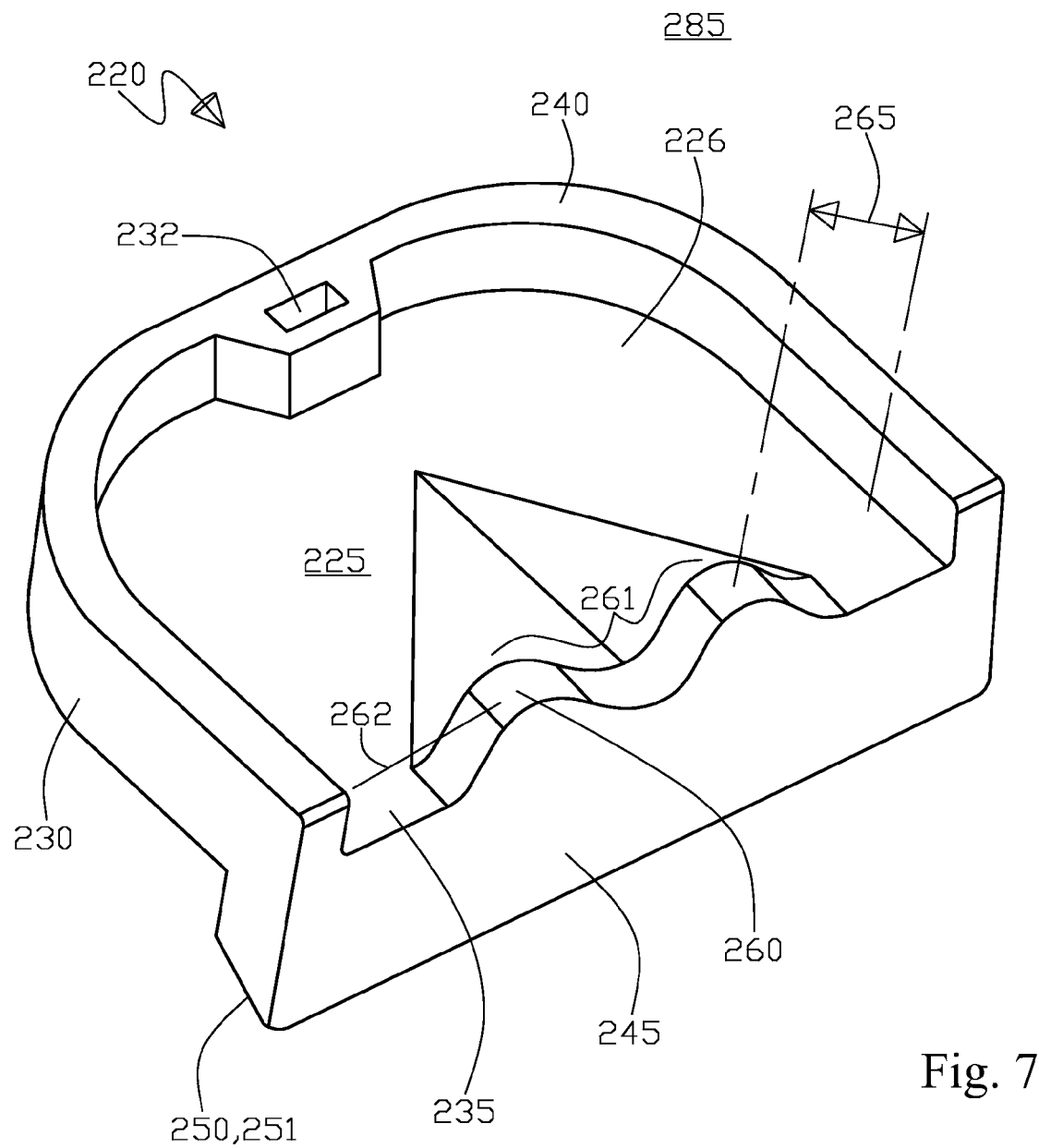
FIG. 7 shows a perspective view of the platform device with the retention basin, the peripheral portion, the spillway margin, the raised rib, the extension, with the extension depending outwardly opposite of the raised rib, and the bi-modal shaped ridge that projects parallel to the raised rib.
Figure 8:
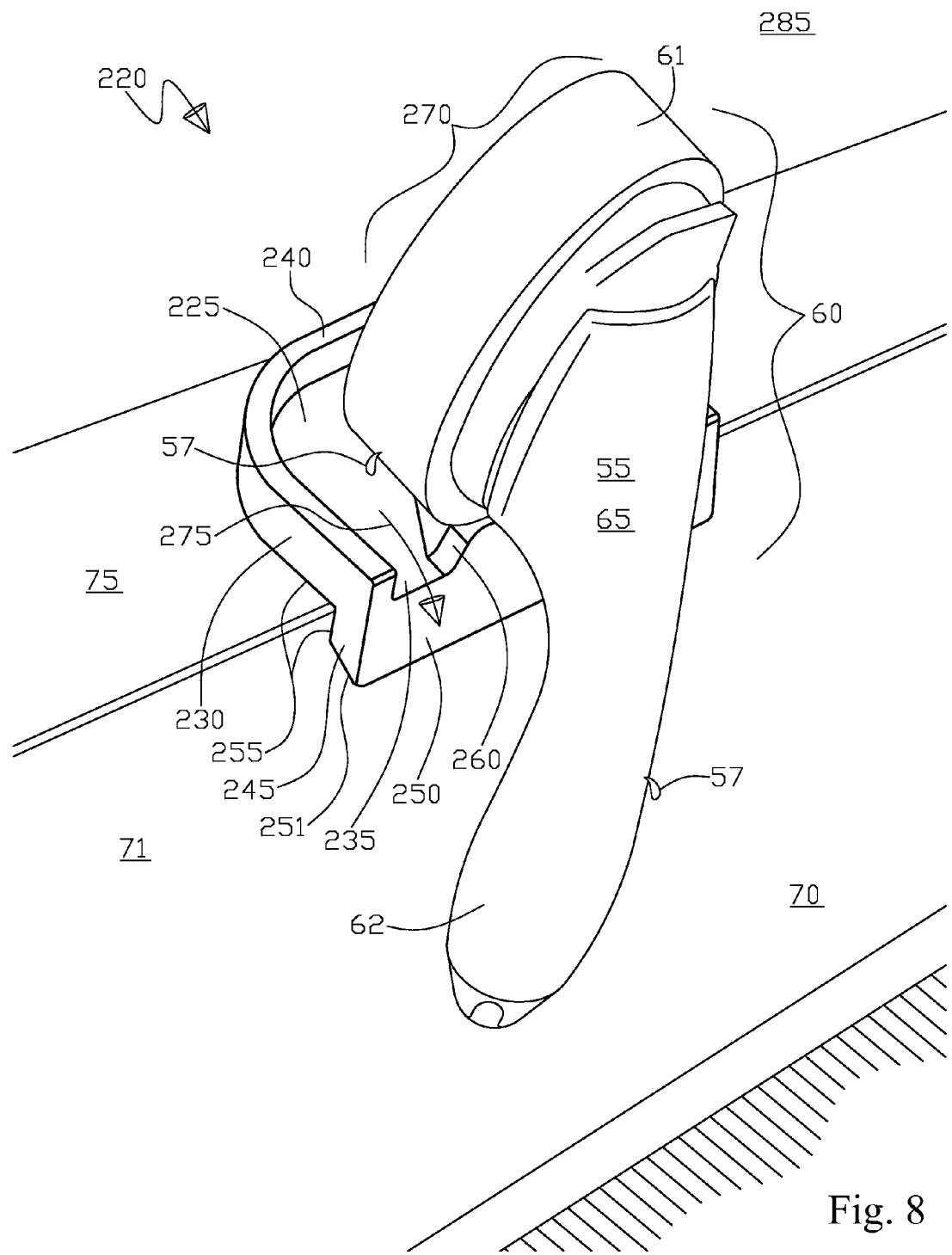
FIG. 8 shows a perspective use view of the platform device with the retention basin, the peripheral portion, the spillway margin, the raised rib, and the extension, with the extension depending outwardly opposite of the raised rib, wherein the basin and extension are substantially conforming to the sink margin of the sink, the bi-modal shaped ridge that projects parallel to the raised rib, the directing of the liquids to the sink, with the ridge retainably suspending a portion of the article over the basin, wherein the article is in the form of a cleaning utensil being self contained cleaning sponge having dishwashing detergent disposed therein.

Continuing, FIG. 7 shows a perspective view of the platform device 220 with the retention basin 225, the peripheral portion 230, the spillway margin 235, the raised rib 240, the extension 245, with the extension 245 depending outwardly 250 opposite of the raised rib 240, the bi-modal shaped ridge 260 that projects parallel 265 to the raised rib 240. Further, FIG. 8 shows a perspective use view of the platform device 220 with the retention basin 225, the peripheral portion 230, the spillway margin 235, the raised rib 240, the extension 245, with the extension depending outwardly 250 opposite of the raised rib 240, wherein the basin 225 and extension 245 are substantially conforming 255 to the sink margin 75 of the sink 70. In addition, in FIG. 8, the bi-modal shaped ridge 260 that projects parallel 265 to the raised rib 240, the directing 275 of the liquids to the sink 70, with the ridge 260 retainably suspending 270 a portion of the article 55 over the basin 225, wherein the article 55 is in the form of a cleaning utensil 65 being self contained cleaning sponge having dishwashing detergent disposed therein.

Figure 9:
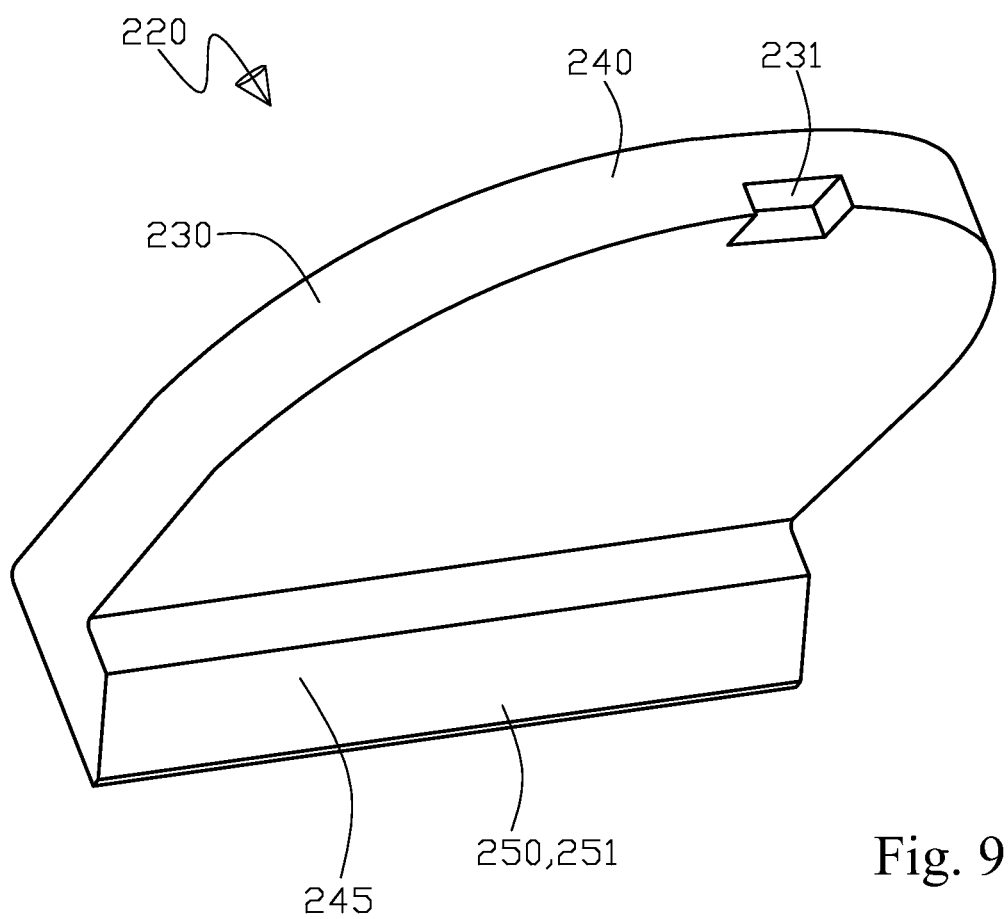
FIG. 9 shows an inverted perspective view of the platform device in relation to FIG. 7, with the peripheral portion, the raised rib, the extension, with the extension depending outwardly opposite of the raised rib.
Figure 10:
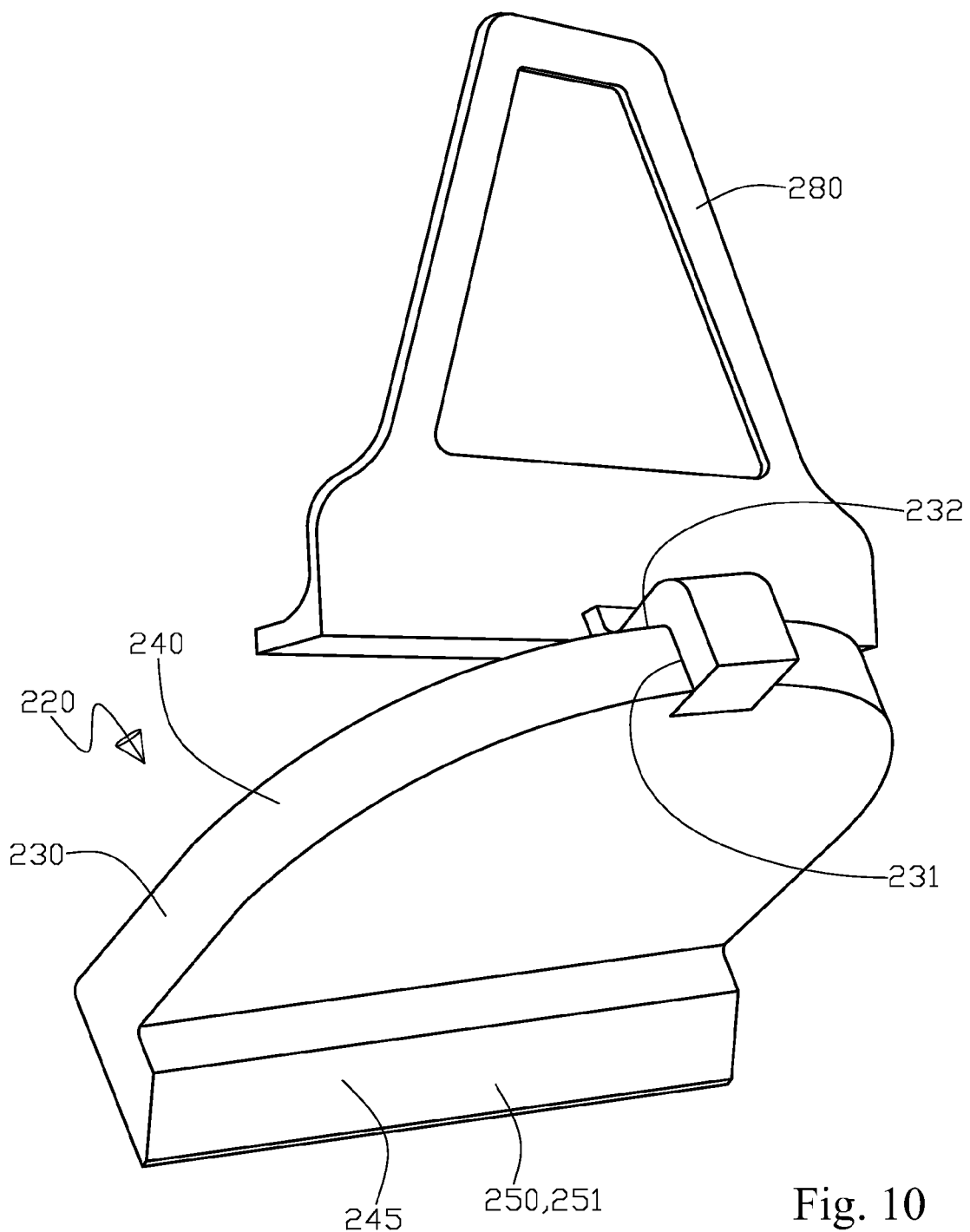
FIG. 10 shows an inverted perspective view of the platform device in relation to FIG. 7, with the peripheral portion, the raised rib, and the extension, with the extension depending outwardly opposite of the raised rib in addition to the sponge support mounted on the raised rib.
Figure 11:
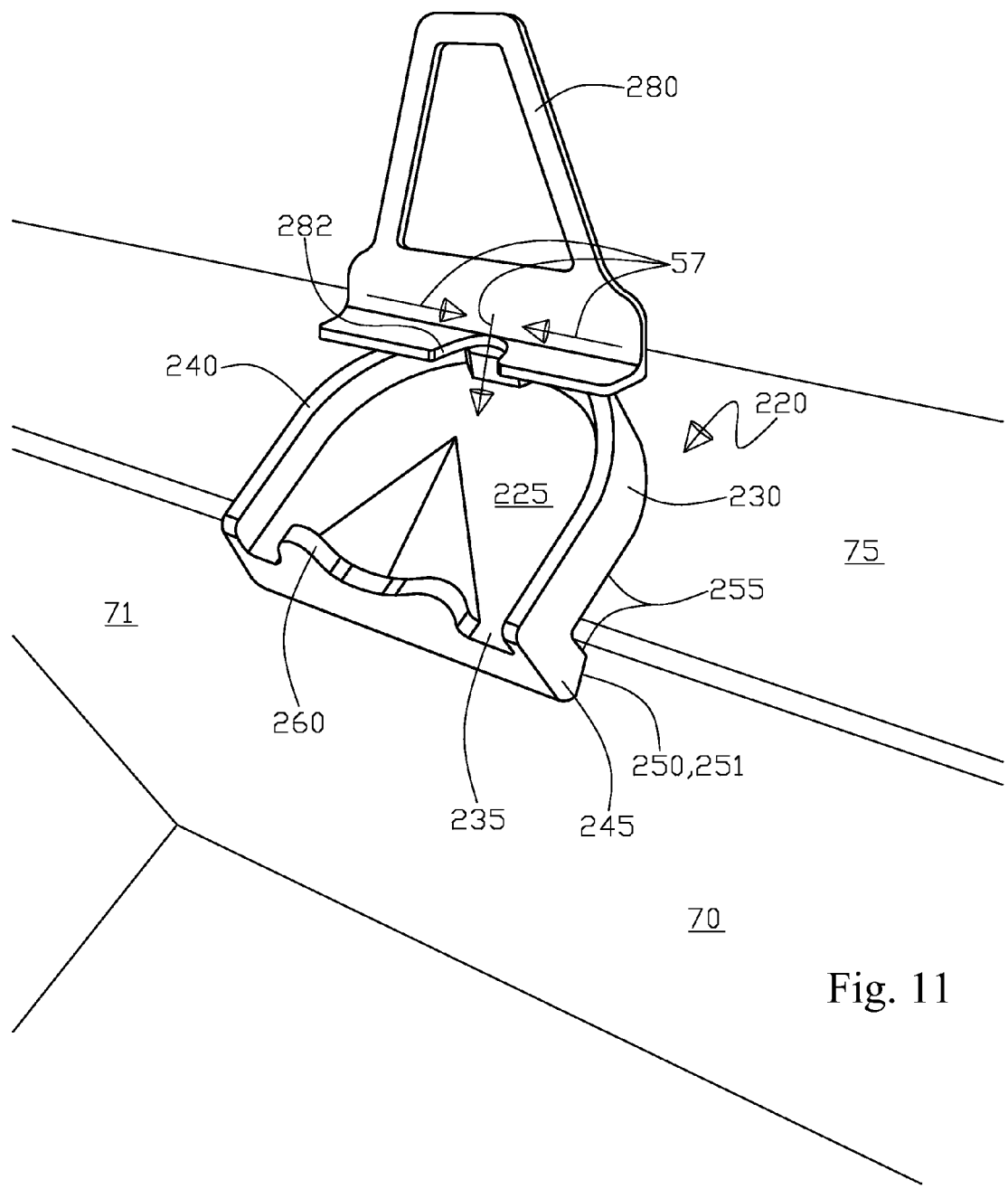
FIG. 11 shows a perspective view of the platform device with the retention basin, the peripheral portion, the spillway margin, the raised rib, and the extension, with the extension depending outwardly opposite of the raised rib, plus the substantial conforming to the sink margin of the sink for the basin and the extension, further the bi-modal shaped ridge that projects parallel to the raised rib and the sponge support are shown.

Moving onward, FIG. 9 shows an inverted perspective view of the platform device 220 in relation to FIG. 7, with the peripheral portion 230, the raised rib 240, the extension 245, with the extension 245 depending outwardly 250 opposite of the raised rib 240. Next, FIG. 10 also shows the inverted perspective view of the platform device 220 in relation to FIG. 7, with the peripheral portion 230, the raised rib 240, the extension 245, with the extension 245 depending outwardly 250 opposite of the raised rib 240 in addition to the sponge support 280 mounted on the raised rib 240. Further, FIG. 11 shows a perspective view of the platform device 220, with the retention basin 225, the peripheral portion 230, the spillway margin 235, the raised rib 240, the extension 245, with the extension 245 depending outwardly 250 opposite of the raised rib 240, the substantial conforming 255 to the sink margin 75 of the sink 70 for the basin 225 and the extension 245, the bi-modal shaped ridge 260 that projects parallel 265 to the raised rib 240, and the sponge support 280.

Figure 12:
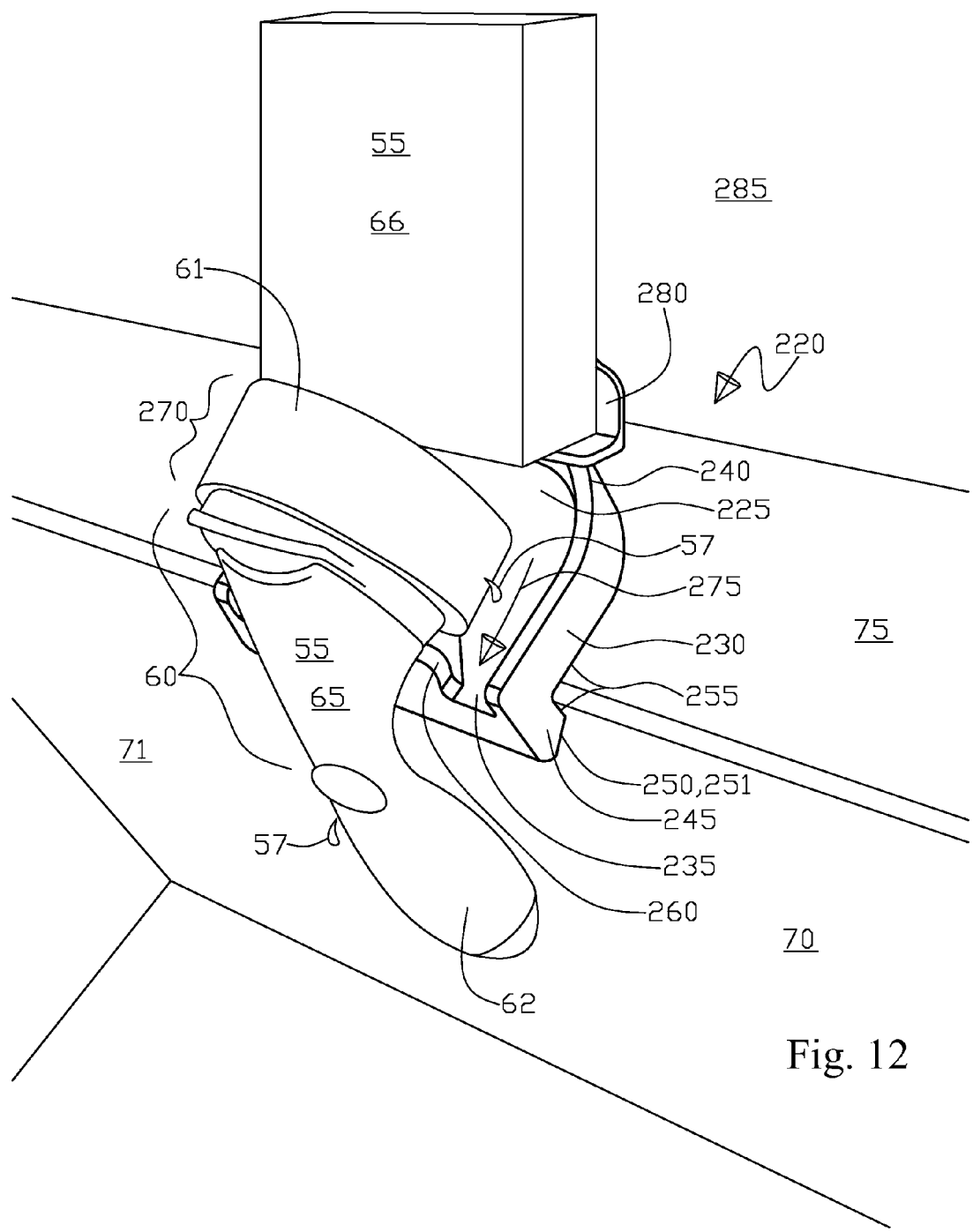
FIG. 12 shows a perspective view of the platform device with the retention basin, the peripheral portion, the spillway margin, the raised rib, the extension, with the extension depending outwardly opposite of the raised rib, the substantial conforming to the sink margin of the sink for the basin and the extension, the bi-modal shaped ridge that projects parallel to the raised rib and the sponge support, the directing of the liquids to the sink, with the ridge retainably suspending a portion of the article over the basin, wherein the article is in the form of a cleaning utensil being self contained cleaning sponge having dishwashing detergent disposed therein, also the sponge support holding a sponge.
Figure 13:
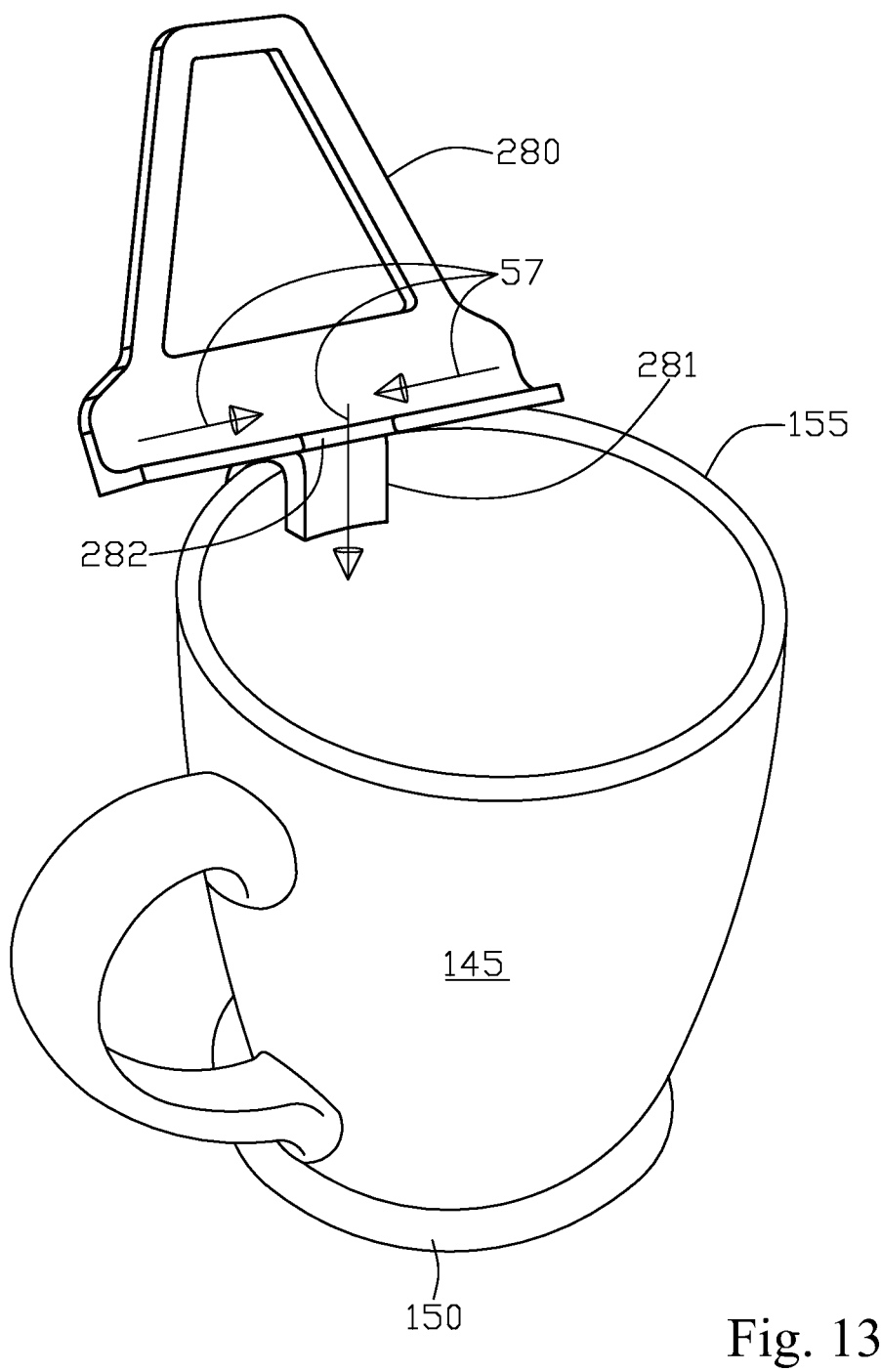
FIG. 13 shows a perspective view of the sponge support that is removably engagable to the opposing lip of the cup, with the cup, and cup bottom shown also.
Figure 14:
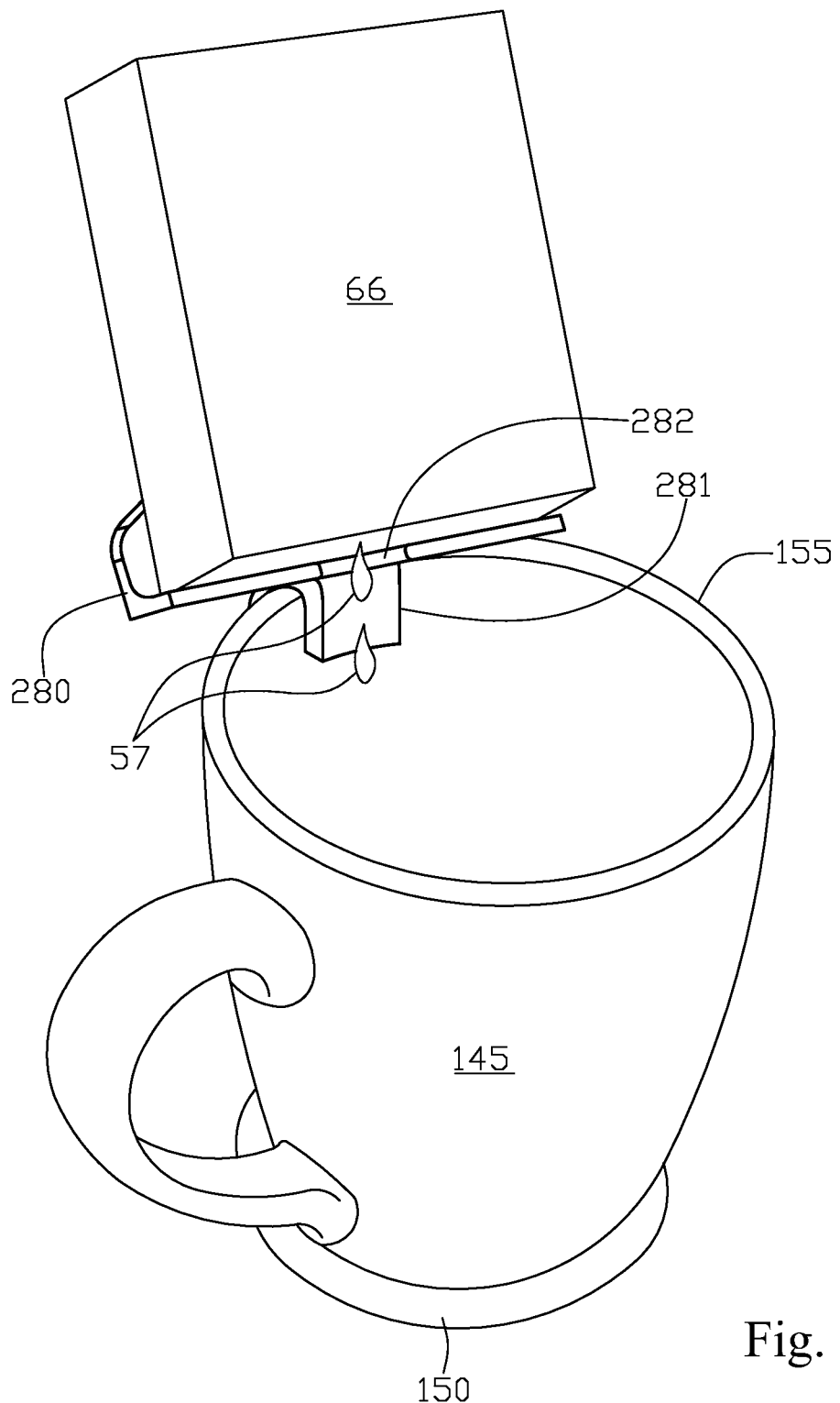
FIG. 14 shows a perspective use view of the sponge on the sponge support that is removably engagable to the opposing lip of the cup, with the cup, and the cup bottom shown also.

Continuing, FIG. 12 shows a perspective view of the platform device 220 with the retention basin 225, the peripheral portion 230, the spillway margin 235, the raised rib 240, the extension 245, with the extension 245 depending outwardly opposite 250 of the raised rib 240, the substantial conforming 255 to the sink margin 75 of the sink 70 for the basin 225 and the extension 245. Further, in FIG. 12, the bi-modal shaped ridge 260 that projects parallel 265 to the raised rib 240, and the sponge support 280, the directing 275 of the liquids to the sink 70, with the ridge 260 retainably suspending a portion of the article 55 over the basin 225, wherein the article 55 is in the form of a cleaning utensil 65 being self contained cleaning sponge having dishwashing detergent disposed therein, also the sponge support 280 holding a sponge 66. Next, FIG. 13 shows a perspective view of the sponge support 280 that is removably engagable to the opposing lip 155 of the cup 145, with the cup 145, and cup 145 bottom 150 shown also. Further, FIG. 14 shows a perspective use view of the sponge 66 on the sponge support 280 that is removably engagable to the opposing lip 155 of the cup 145, with the cup 145, and cup 145 bottom 150 shown also.

Broadly, in looking at FIGS. 1 through 3, the present invention is for the support device 50 for an article 55 that is adjacent to a sink 70 margin 75, with the support device 50 including the first arcuate flexible finger 80 having the longitudinal axis 85, the first finger 80 having a proximal end portion 90 and an opposing distal end portion 95 and the second arcuate flexible finger 100 having a lengthwise axis 105, the second finger 100 having a proximal end portion 110 and an opposing distal end portion 115. Further included in the support device 50 is the shoulder element 120 that is sized and configured to cradle 125 the article 55 in an upright position 60, the shoulder element 120 is disposed in an attached manner therebetween the first proximal end portion 90 and the second proximal end portion 110. Wherein the first flexible finger 80, the shoulder element 120, and the second flexible finger 100 approximately form an inverted "U" symmetrical shape 130 that frictionally straddles 135 the sink 70 margin 75, wherein operationally the support device 50 cradles the article 55 in the upright position 60 adjacent to the sink 70 margin 75. Wherein the article 55 can be supported in either one of two opposing positions with the article 55 adjacent to the shoulder element 120 and the first arcuate flexible finger 80 or the article 55 adjacent to the shoulder element 120 and the second arcuate flexible finger 100.

Further on the support device 50 for the article 55, the shoulder element 120 can further comprise a cradle segment 125 that has a continuously curving concave surface to suspend in an adjacent manner the article 55 in an open environment 285, see FIGS. 1, 2, and 3. In addition, for the support device 50 for the article 55, the cradle segment 125 can also extend for a full width of the shoulder element 120 in an arcuate axis 126 that is perpendicular 127 to the longitudinal 85 and lengthwise 105 axes to facilitate article 55 drainage or seepage 57 in the open environment 285, again see FIGS. 1, 2, and 3. Also the article 55, as shown in FIGS. 1, 2, and 3, can be in the form of a cleaning utensil 65 being the self-contained cleaning sponge 61 having dishwashing detergent stored in a reservoir 62 in the cleaning utensil 65 handle 62, with the cleaning utensil 65 being supported by the support device 50 in the open environment 285, with the open environment 285 being defined as having free and open access all around the external surfaces of the cleaning utensil 65 for seepage 57 of the dishwashing detergent to drain back into the sink 70 without the need of a drainage channel in the support device 50, as best shown in FIG. 3.

Also, on the support device 50 for the article 55 the first 80 and second 100 arcuate flexible fingers preferably depend downwardly from the shoulder element 120 in a continuous arc from the first 90 and second 110 proximal end portions to the first 95 and second 115 distal end portions along the longitudinal 85 and lengthwise 105 axes respectively to conform to the sink margin 75 and sink walls 71 on each opposing side of the sink margin 75, as best shown in FIGS. 2 and 3. Further, on the support device 50 for the article 55 the first 95 and second 115 distal end portions can further comprise a first curved extension 96 and a respective second curved extension 116 to further support the article 55 or as preferably shown the reservoir handle 62 as shown in FIG. 3. Continuing, for the support device 50 for the article 55 wherein the first 96 and second 115 curved extensions can form respective first 97 and second 117 concave channels that are each coincident to the continuously curving concave surface of the cradle segment 125, see FIGS. 1 and 2.

As an alternative embodiment, in looking at FIGS. 4 through 6, the shoe assembly 140 utilizes a cup 145 with a bottom 150, and the opposing lip 155, for upright support 60 of an article 55 upon a surface 160, in the open environment 285 with the shoe assembly 140 including a base 165, wherein the base 165 sized and configured to accommodate 170 the cup 145 bottom 150 and include an extension 175 with a depression 180 disposed therein to receive 185 a portion of the article 55. Further included in the shoe assembly 140 is the flexible clip 190 having an inward portion 200 that is disposed upon the lip 155, the clip 190 having an opposing outward portion 205 with a cradle portion 210 disposed opposite of the lip 155, wherein operationally the cradle portion 210 retainably suspends 215 an opposing portion of the article 55 over the lip 155 facing the bottom 150 in the open environment 285.

Also, for the shoe assembly 140, the cradle portion 210 preferably has a continuously curving concave surface 212 to suspend in an adjacent manner the article 55 in an open environment 285, see FIGS. 5 and 6 or detail. Also the article 55, as shown in FIG. 6, can be in the form of a cleaning utensil 65 being the self-contained cleaning sponge 61 having dishwashing detergent stored in a reservoir 62 in the cleaning utensil 65 handle 62, with the cleaning utensil 65 being supported by the shoe assembly 140 in the open environment 285, with the open environment 285 being defined as having free and open access all around the external surfaces of the cleaning utensil 65 for seepage 57 of the dishwashing detergent to drain back into the cup 145 and depression 180 without the need of a drainage channel in the shoe assembly 140, as best shown in FIG. 6.

Continuing for the shoe assembly 140 wherein the cradle portion 210 can extend for a full width of the flexible clip 190 along a curved axis 211 to further support the article 55 over the lip 155 facing the bottom 150 in the open environment 285, as best shown in FIG. 5. In addition, for the shoe assembly 140 the base can further comprise a peripheral ridge 176 that forms a part of the base depression 180; see FIG. 4, wherein the peripheral ridge helps to retain the article 55 seepage 57, as best shown in FIG. 6. Also, for the shoe assembly 140, the base 165 can further comprise a receiving slot 181 forming a portion of the base depression 180, see FIG. 4, wherein the receiving slot 181 is operational to receive a portion of the article 55, namely the reservoir handle 62, to facilitate retaining different length 56 articles 55, as best shown in FIG. 6. Further, on the shoe assembly 140, the base 165 can further comprise a receptacle 177 formed from an interface as between the receiving slot 181 and the peripheral ridge 176, as best shown in FIG. 4, wherein the receptacle 177 adds volume to the depression 180 for receiving a portion of the seepage 57 from the article 55, see FIG. 6. Further on the shoe assembly 140, it can further comprise a sponge support 280 that includes a support lip 281 interface that is removably engagable to the cup lip 155, being operational to support a sponge 66 in addition to the article 55, as shown in FIGS. 13 and 14.

As another alternative embodiment, in looking at FIGS. 7 through 12, the platform device 220 is for the article 55 that is adjacent to a sink 70 with a sink margin 75, the platform device includes the retention basin 225 including the peripheral portion 230 and the spillway margin 235, with the retention basin 225 having a raised rib 240 adjacent to the peripheral portion 230. Further, in the platform device 220 is the extension 245 that is affixed to the spillway margin 235, the extension 245 depending outwardly 250 opposite of the raised rib 240, wherein the basin 225 and the extension 245 substantially conform 255 to the sink 70 margin 75. Also, in the platform device 220 included is the bi-modal shaped ridge 260 affixed to a portion of the spillway margin 235, with the bimodal ridge 260 projecting parallel 265 to the raised rib 240, wherein operationally the ridge 260 retainably suspends 270 a portion of the article 55 over the basin 225 that directs article 55 liquids 275 and seepage 57 to the sink 70.

Also, for the platform device 220 for the article 55, wherein the bi-modal shaped ridge 260 can have a continuously curving concave surface 261 to suspend in an adjacent manner the article 55 to be elevated above a floor 226 of the retention basin 225 to operationally facilitate the article 55 seepage 57 throughout an entire area of the floor 226, as best shown in FIGS. 7, 8, and 12. Further, on the platform device 220 for the article 55, the bi-modal shaped ridge 260 can extend to at least as high 262 as the raised rib 240 to further ensure to suspend in an adjacent manner the article 55 to be elevated above the floor 226 of the retention basin 225 to operationally facilitate the article 55 seepage 57 throughout an entire area of the floor 226, see FIGS. 7, 8, and 12.

As for the article 55, as shown in FIGS. 8 and 12, can be in the form of a cleaning utensil 65 being the self-contained cleaning sponge 61 having dishwashing detergent stored in a reservoir 62 in the cleaning utensil 65 handle 62, with the cleaning utensil 65 being supported by the platform device 220 in the open environment 285, with the open environment 285 being defined as having free and open access all around the external surfaces of the cleaning utensil 65 for seepage 57 of the dishwashing detergent to drain back into the entire area of the floor 226 of the retention basin 225, via the sponge 61 being elevated above the floor 226, i.e. not resting upon the floor 226, with the sponge 61 being elevated above the floor 226 from the bi-modal shaped ridge 260 extending to at least as high 262 as the raised rib 240, see FIG. 7, thus suspending the sponge 61 up off of the floor 226, see FIGS. 8 and 12. Thus operationally allowing the sponge 61 to completely drain itself of dishwashing liquid and allow the floor 226 to completely drain of dishwashing liquid, plus having the benefit of less chance of the dishwashing liquid "wicking" up from the reservoir handle 62 to the sponge 61, on the floor 226 to the sink margin 75 and down the sink walls 71, as the sink walls 71 potentially being lower than the reservoir handle 62, will via gravity draw out the dishwashing liquid from the reservoir handle 62, potentially wasting the dishwashing liquid from the reservoir handle 62, of which suspending the sponge 61 up off of the floor 226 helps to prevent.

Continuing, for the platform device 220 for the article 55, wherein the peripheral portion 230 can further comprise an outer peripheral notch 231, as shown in FIG. 9 or an inner peripheral notch 232, see FIG. 7 for receiving a sponge support 280, as best shown in FIGS. 9, 10, 11, and 12. In addition, for the platform device 220 for the article 55, wherein the notch 231 is oppositely positioned from the bi-modal shaped ridge 260 on the retention basin 225 to operationally facilitate the platform device 220 to support the article 55 and a sponge 66 simultaneously, as shown in FIG. 12. Also on the platform device 220 for the article 55 the sponge support 280 can further comprise a centrally located drain aperture 282 as shown in FIG. 11. Further on the platform device 220 for the article 55 wherein the extension 245 further comprises a reverse angled end portion 251 to minimize capillary action of the article seepage 57 toward the area identified as substantially conforming 255 to the sink margin, preferably the reverse angled end portion 251 has an angle of about ten to fifteen degrees as related to the sink margin 75.

CONCLUSION

Accordingly, the present invention of a support device has been described with some degree of particularity directed to the embodiments of the present invention. It should be appreciated, though; that the present invention is defined by the following claim construed in light of the prior art so modifications or changes may be made to the exemplary embodiments of the present invention without departing from the inventive concepts contained therein.

The invention claimed is:
1. A support device for an article that is adjacent to a sink margin and sink walls, said support device comprising:
 (a) a first arcuate flexible finger having a longitudinal axis, said first finger having a first proximal end portion and an opposing first distal end portion;
 (b) a second arcuate flexible finger having a lengthwise axis, said second finger having a second proximal end portion and an opposing second distal end portion; and
 (c) a shoulder element that is sized and configured to cradle the article in an upright position, said shoulder element is disposed in an attached manner therebetween said first proximal end portion and said second proximal end portion, said shoulder element includes a cradle segment that has a continuously curving concave surface wherein said cradle segment extends for a full width of said shoulder element in an arcuate axis that is perpendicular to said longitudinal and lengthwise axes, wherein said first flexible finger, said shoulder element, and said second flexible finger approximately form an inverted symmetrical "U" shape that frictionally straddles the sink margin, wherein operationally said support device cradles the article in an upright position adjacent to the sink margin via said cradle segment that suspends the article in an open environment to facilitate article drainage in the open environment, wherein the article can be supported in either one of two opposing positions with the article adjacent to said shoulder element and said first arcuate flexible finger or the article adjacent to said shoulder element and said second arcuate flexible finger.

2. A support device for an article according to claim 1 wherein said first and second arcuate flexible fingers depend downwardly from said shoulder element in a continuous arc from said first and second proximal end portions to said first and second distal end portions along said longitudinal and lengthwise axes to conform to the sink margin and the sink walls.

3. A support device for an article according to claim 2 wherein said first and second distal end portions further comprise a first curved extension and a respective second curved extension to further support the article.

4. A support device for an article according to claim 3 wherein said first and second curved extensions form respective first and second concave channels that are each coincident to said continuously curving concave surface of said cradle segment.

\* \* \* \* \*